United States Patent [19]

Arikawa

[11] Patent Number: 4,961,036
[45] Date of Patent: Oct. 2, 1990

[54] SYSTEM FOR CONTROLLING A WORKING SHAFT

[75] Inventor: Haruhiko Arikawa, Kyoto, Japan

[73] Assignee: Mycom Kabushiki Kaisha, Kyoto, Japan

[21] Appl. No.: 485,690

[22] Filed: Feb. 27, 1990

[30] Foreign Application Priority Data

Apr. 11, 1989 [JP] Japan .................................. 1-91194

[51] Int. Cl.$^5$ ............................................. H02P 5/40
[52] U.S. Cl. ................................... 318/603; 318/613; 318/618; 388/810; 388/811
[58] Field of Search ............................... 388/800–834; 318/280–294, 430–434, 560–640

[56] References Cited

U.S. PATENT DOCUMENTS

| 3,268,788 | 8/1966 | Branco | 388/813 X |
| 3,361,949 | 1/1968 | Brown et al. | 388/814 X |
| 3,967,177 | 6/1976 | Scholten et al. | 318/603 |
| 4,216,419 | 8/1980 | Van Dam et al. | 388/810 |
| 4,310,787 | 1/1982 | Seeger et al. | 388/814 X |
| 4,319,172 | 3/1982 | Sieradzki | 318/618 X |
| 4,353,020 | 10/1982 | Veale | 318/601 |
| 4,380,723 | 4/1983 | Leis et al. | 388/811 |
| 4,586,124 | 4/1986 | Wiederstein | 318/601 X |

Primary Examiner—William M. Shoop, Jr.
Assistant Examiner—Paul Ip
Attorney, Agent, or Firm—Armstrong, Nikaido, Marmelstein, Kubovcik & Murray

[57] ABSTRACT

The inventive system for controlling a working shaft includes a layout for the time to number conversion, wherein a divider is provided to divide with use of a pulse rate outputted from the memory storage, and the shaft driver is operated by output from such a divider and is thereby controlled with use of the data stored in the memory storage. Concurrently, by introducing the counter outputs indicating the time scaling into the addresses of a memory sector, the memory sector is arranged to output varying speed data corespondent to the time scaling data. Thereby trailing actions of the working shaft to trace a given locus are determined by data stored in the memory storage, which enables a complex real time control to be feasible by the inventive simple control system, wherein, as required, a change in the control specification is simply made by a change of data in the memory storage.

1 Claim, 3 Drawing Sheets

SYSTEM FOR CONTROLLING A WORKING SHAFT

FIELD OF THE INVENTION

This invention relates to a computerized system for controlling a plurality of working shafts including the case of one single working shaft to be controlled by means of a system for a virtual plurality of shafts. Particularly, this invention relates to a computerized system for controlling at least one working shaft with use of speed data that was priorly stored in a memory storage section of the computer system.

DESCRIPTION OF THE CONVENTIONAL ART

In control of actions of a multi spindle automatic lathe or in control of actions of a machine for knitting fishing nets, it has been known that a trailing on a complex spatial locus is required to perform on real time basis the simultaneous control of a number of working shafts, wherein high speed computations by a computer are necessary to cope with such actions and therefor conventionally the computations have been loaded to a plurality of micro-processors. In the case of controlling working shafts wherein further complex computations are needed, with which the micro-processors are difficult to cope, employed therefore has been the linked use of complementary ICs that are intended to solely perform high speed computations or the joint use of cams having unique suitable locus shapes.

However, conventional approaches as noted have involved the difficulties that the control systems for real time service have become to have so large scales in order to comply with required high speed computations wherein the complexity increases with increment like a geometric series.

On the other hand, the use of unique cams as noted also involves the difficulty of redesigning them to suit other requirements, wherein one operational requirement needs one design cam, which situation does not dispense with the existing difficulties.

SUMMARY OF THE INVENTION

This invention is proposed to resolve such difficulties as noted with the conventional art and is intended to offer a simple control system having merits of flexibility in changing operational requirements and of enablement of performing complex controls with the real time basis.

Thus, the present invention is summarized as follows:
a system for controlling a working shaft, which comprises:
- a counter fed with clock signals to work as reference timing for actions in downstream;
- a memory sector, laid relative to each working shaft to be controlled, having addresses accessible to output from said counter;
- a divider laid correspondent to said memory sector and enabled to divide the clock signals with use of output from the memory sector;
- a shaft driver to control a shaft with a speed relative to output from the divider;
- wherein said memory sector is priorly stored with data on speed operative to the shaft to be controlled.

Therein, the counter issues counting clock signals to act as reference timing for downstream actions, which signals form data to indicate positional scalings on the time axis.

On the other hand, to the address input of a memory sector wherein data for performing the intended control is stored, accessed are output from the counter, which layout feeds a timing position at each time point to the memory sector, wherein speed data, that is the data stored priorly for the intended control, is enabled to be read out in correspondence to each time point and this speed data is fed to a downstream divider or secondary divider which divides or demultiplies the speed data to obtain the control data which is fed to a driver device of a working shaft.

In essence, the shaft driver operates following the speed data which is stored in the memory sector and which is accessible by indicating the address number, wherein the address number is indicated by result of the time-to-number (or count) conversion and the speed data is read out in correspondence to the address number.

DESCRIPTION OF THE INVENTIVE EMBODIMENT(S)

Figure 1:
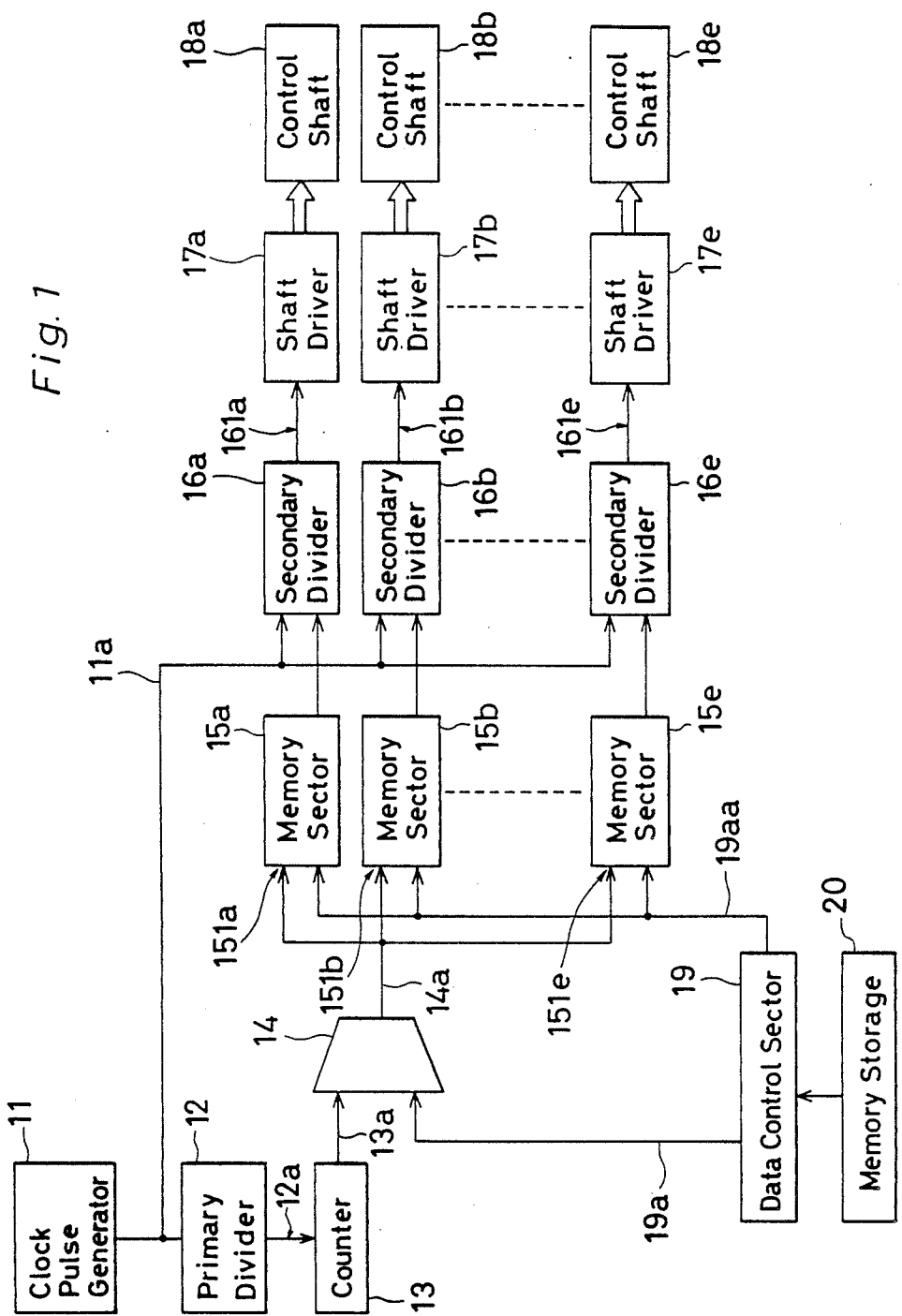
FIG. 1 is a schematic block diagram to show electrical layout of an inventive embodiment.

The attached FIG. 1 is a schematic diagram to represent an embodiment by way of blocks and connecting lead lines.

Therein, 11 is a clock signal generator which generates original reference clock pulses, of which output is fed to a primary divider or demultiplier 12 which sets up a reference scaling of the time counting, and the divider 12 outputs clock signals on a line 12a to a counter 13 which transmits the resulting counts on a line 13a to one of two inputs of an address multiplexer 14.

Output of the address multiplexer 14 is fed on a line 14a to fan out to five address inputs, 151a to 151e, of five memory sectors, 15a to 15e, which comprise RAM as memory elements respectively.

Each of the five memory sectors, 15a to 15e, outputs data to each of secondary dividers, 16a to 16e, to which the original clock pulses are also fed via another line 11a from the pulse generator 11.

It is to be noted here that a reference numeral to denote a lead line is sometimes used to mean electrical signals or outputs which pass the same line.

Each of the secondary dividers, 16a to 16e, outputs data on each of lines. 161a to 161e, to each of pulse motors or pulse motor driver devices, 17a to 17e, which defines a circuit for driving each of shafts, 18a to 18e.

On the other hand, a memory storage 20 which includes a hard disk device outputs data to a data control sector 19, from which the address data is fed to the multiplexer 14 via a line 19a and control data is fed to the memory sectors, 15a to 15e, via a line 19aa.

Turning reference to operations involved the system noted above.

Prior to acting on operations to carry out the inventive purpose of controlling a multiple drive shafts, the data control sector 19 reads out from the memory storage 20 the necessary data to carry out the task jobs, and with aid of the address multiplexer 14 to specify the addresses, the read out data for indicating the addresses and the data for instructing the control operations are sent to or fanned in the memory sectors, 15a to 15e, and stored in the RAMs thereof. Then, the multiplexer 14 is switched over to form the route of receiving data from the counter 13 to fan out to the memory sectors, 15a to 15e.

Figure 2:
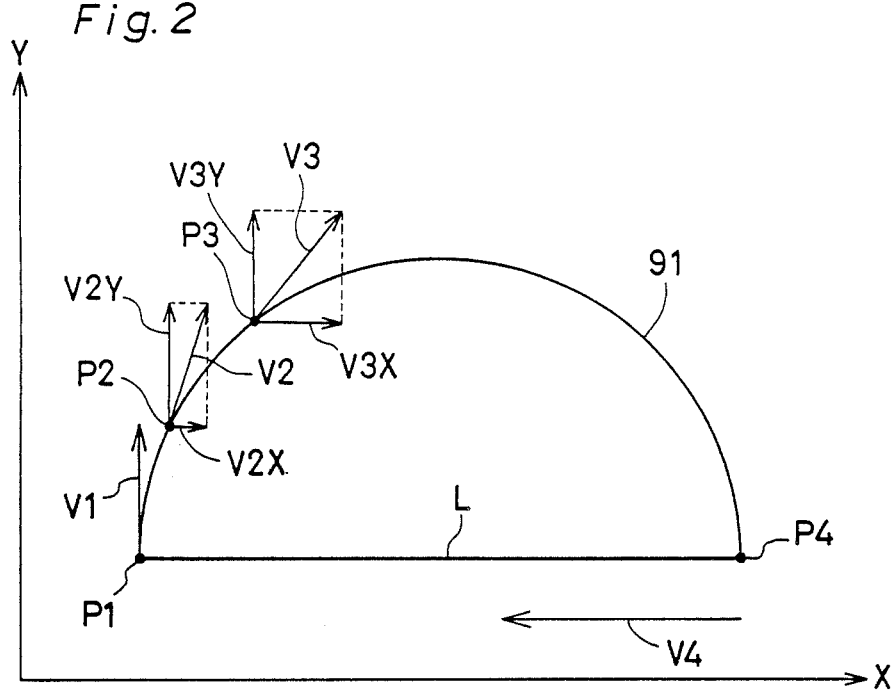
FIG. 2 is a diagram to explain an example of a locus to be traced or trailed by the control system.

It is to be noted here that FIG. 1 shows the system for simultaneous or cooperative controlling by five drive shafts, 18a to 18e, but in order to simplify the matter, the following accounts will refer to the two dimensional control by the two shafts, 18a and 18b, with reference to FIG. 2.

It is assumed that the shaft 18a will control behaviors in the direction of Y axis while the shaft 18b will do the same in the direction of X axis so that these two shafts, 18a and 18b, will, in synthesis trail, trace or scan along a locus of a half circle 91 as shown, and that the initial trailing point lies at P1 when the output of the counter 13 is the count 0, and that P2 and P3 are represented when the counter 13 outputs 100 and 200 respectively.

Accordingly, in the address cell numbered 0 of the memory sector 15a, data for a pulse rate is stored which is proportional to the Y-axis length of the vector V1 at P1, that is, indicative of a travel speed of the working shaft 18a, wherein actually the vector V1 has only a component in the Y-axis. On the other hand, in the address cell numbered 0 of the memory sector 15b, data for a pulse rate is stored which is proportional to the X-axis length of the vector V1 at P1, that is, indicative of a travel speed of the working shaft 18b, wherein actually the vector V1 has no component in X-axis and wherein the data for the pulse rate is realized by making on H level the bit to stop feed of the divided output 161b.

Then, in the address cells numbered 100 (for P2 and V2) of both the memory sectors, 15a and 15b, stored respectively are data for the pulse rate indicating the Y-axis component V2Y and the same indicating the X-axis component V2X. Similar arrangements are prepared for P3 and V3, and so on. Further, the similar are also true of intermediate addresses between 0 and 100. Broadly it is assumed that each address stores the data for a pulse rate which will turn a vector component at the address numbered trailing point.

When the counter 13 starts counting from its reset state, data representing the vector V1 is fed from the memory sectors, 15a and 15b, to downstream the secondary dividers, 16a and 16b, and in turn, the data on the vector V1 emerges on the leads, 161a and 161b, to downstream the shaft drivers, 17a and 17b. As noted above, V1 has no effect to the X-axis and then only the control shaft 18a is activated into the move by the pulse motor, that is, driver 17a, with a fairly large speed corresponding to short cycle pulses defined by the output 161a.

In the meantime, the output 161b from the divider 16b is nothing, which leads the pulse motor of the driver 17b to be out of working.

In turn, as the counting by the counter 13 progresses, the travel speed of the shaft 18a gets slower step by step while the shaft 18b, in contrast, gets start to move with an increasing travel speed.

When the counter 13 outputs the number 100, the memory sector 15a outputs the data for the vector component V2Y and the memory sector 15b does the data for the vector component v2X, which provides the shaft 18a to travel with a speed correspondent to V2Y and simultaneously the shaft 18b to travel with a speed correspondent to V2X.

After the same actions have been repeated in turn to trace the half circle, when the trailing point reaches the point P4, output from the divider 16a stops and the same from the divider 16b assumes the vector V4, which provides the shaft 18b to move correspondent to the vector V4, that is, to reverse the traveling direction with a fairly high speed as is understood in FIG. 2. Thence, the trailing action tends to go on the line L to come back to the point P1, and then to reset.

With use of the similar principles, in the case of five shafts, the memory sectors, 15a to 15e, are provided with the data to control the shafts, 18a to 18e.

Figure 3:
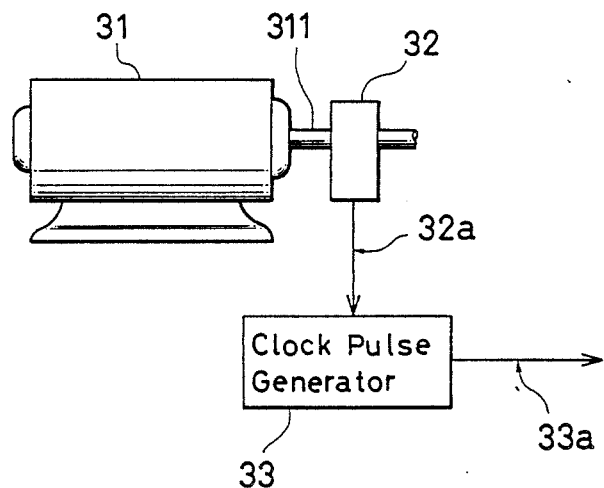
FIG. 3 is a schematic drawing with blocks of another embodiment for the clock signal generator.

FIG. 3 is another embodiment of the clock pulse generator 11 as shown in a block diagram and a schematic drawing.

The motor 31 in this embodiment is assumed to a motor which is assigned to move a table with a mass of material thereon and which is accordingly unable to change speeds so quickly, In view of such working conditions, rotary positions of the shaft of the motor 31 are employed as reference to all downstream actions.

Consequently, a rotary encoder 32 is mounted on the motor shaft 311 and pulses 32a from the rotary encoder 32 are fed to a clock pulse generator 33 equipped with the PLL circuit, and in turn, output from the generator 33 forms clock signals 33a and is fed to the secondary dividers, 16a to 16e, and the primary divider 12.

Figure 4:
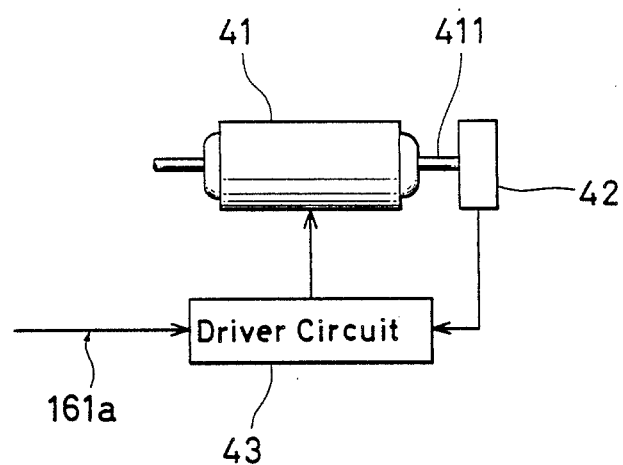
FIG. 4 is a schematic drawing with blocks of another embodiment for the shaft driver.

FIG. 4 is another embodiment of the shaft drivers, 17a to 17e, as shown in a block diagram and a schematic drawing.

In the layout as shown in FIG. 1, the shaft drivers, 17a to 17e, are defined of pulse motors, which is, in this embodiment, replaced by a servo motor having its output shaft mounted with a rotary encoder 42. This servo motor 41 is driven under instructions from the driver circuit 43 to which both the output from the encoder 42 and the same 161a from the secondary divider 16a are introduced, wherein operation of the servo motor 41 is controlled so that the motor shaft 411 will rotate according to the time schedule from one pulse in the output 161a to one pulse by the rotary encoder 42. Thereby the servo motor 41 is virtually acted as a pulse motor.

The present invention should not limited to embodiments as noted above. For instance, FIG. 1 illustrates the case of five shafts, 18a to 18e, but the number of such shafts are permitted to take a different number, two or six, for instance, and further the present invention is applicable to a system having one working shaft with speed and angle change capability.

In access operations to the memory sectors, 15a to 15e, access operations from two sources: data control sector 19 and counter 13: may be subjected to a time-sharing system so that a change of data stored in the sectors, 15a to 15e, will be allowed during one time share.

Further, the memory sectors, 15a to 15e, are illustrated by RAM, but these sectors may consist of ROM having the data stored priorly, and in the case of ROM, the address multiplexer 14, data control sector 19, and memory storage 20 may be dispensed with.

In the case of intending a working performance which is based on a non-mathematical or experience-based locus without a mathematical basis, by storing data to trail such a locus into the memory storage, such intention will be feasible.

The inventive system for controlling a working shaft includes a layout for the time to number conversion art, wherein a secondary divider is provided to divide with use of a pulse rate outputted from the memory storage, and the shaft driver is operated by output from such a divider and is thereby controlled with use of the data stored in the memory storage. Concurrently, by introducing the counter outputs indicating the time scaling into the addresses of a memory sector, the memory sector is arranged to output varying speed data correspondent to the time scaling data. Thereby trailing actions of the working shaft are determined by data stored in the memory storage, which enables a complex real time control to be feasible by the inventive simple control system, wherein, as required, a change in the control specification is simply effected by a change of data in the memory storage.

What is claimed is:
1. A system for controlling a working shaft, which comprises:
 a counter fed with clock signals to work as reference timing for actions in downstream;
 a memory sector, having addresses accessible to output from said counter;
 a divider connected to said memory sector and enabled to divide the clock signals with use of output from the memory sector;
 a shaft driver to control the working shaft with a speed relative to output from the divider;
 wherein said memory sector is priorly stored with data on speed operative to the shaft to be controlled.

* * * * *